United States Patent
Honjo et al.

(10) Patent No.: US 7,178,367 B2
(45) Date of Patent: Feb. 20, 2007

(54) APPARATUS AND METHOD FOR BEND-SHAPING A GLASS SHEET

(75) Inventors: Seiichiro Honjo, Osaka (JP); Takeshi Yabuno, Osaka (JP); Yasuyuki Nagai, Osaka (JP)

(73) Assignee: Nippon Sheet Glass Company, Limited, Osaka (JP)

( * ) Notice: Subject to any disclaimer, the term of this patent is extended or adjusted under 35 U.S.C. 154(b) by 485 days.

(21) Appl. No.: 10/786,145

(22) Filed: Feb. 23, 2004

(65) Prior Publication Data
US 2004/0163416 A1    Aug. 26, 2004

Related U.S. Application Data

(62) Division of application No. 09/909,437, filed on Jul. 19, 2001, now Pat. No. 6,725,689.

(30) Foreign Application Priority Data
Jan. 24, 2001    (JP)    ............... 2001-016394

(51) Int. Cl.
C03B 18/00    (2006.01)
C03B 23/02    (2006.01)
C03B 23/025    (2006.01)
C03B 23/035    (2006.01)

(52) U.S. Cl. ............... 65/182.2; 65/290; 65/291

(58) Field of Classification Search ............... 65/182.2, 65/290, 291, 106
See application file for complete search history.

(56) References Cited

U.S. PATENT DOCUMENTS

| 3,332,759 | A | | 7/1967 | McMaster et al. |
| 3,332,760 | A | | 7/1967 | McMaster et al. |
| 3,409,422 | A | * | 11/1968 | Gulotta ............... 65/25.4 |
| 5,009,695 | A | * | 4/1991 | Kuster et al. ............... 65/182.2 |
| 5,522,912 | A | * | 6/1996 | Kobayashi et al. ............... 65/182.2 |
| 6,014,873 | A | | 1/2000 | Hirotsu et al. |
| 2002/0148254 | A1 | * | 10/2002 | Nishitani et al. ............... 65/104 |

FOREIGN PATENT DOCUMENTS

| JP | 43-11768 | 5/1943 |
| JP | 5-9037 | 1/1993 |
| JP | 6-191867 | 7/1994 |

* cited by examiner

Primary Examiner—Steven P. Griffin
Assistant Examiner—Jason L. Lazorcik
(74) Attorney, Agent, or Firm—Hamre, Schumann, Mueller & Larson, P.C.

(57) ABSTRACT

An apparatus for bend-shaping a glass sheet is disclosed, which comprises a heating furnace, a plurality of in-furnace beds disposed within the heating furnace, at least one out-furnace bed disposed externally of the heating furnace proximately to an outlet of the heating furnace, and an elevating mechanism disposed below that one of the in-furnace beds which is positioned proximately to the outlet and the out-furnace bed. The in- and out-furnace beds have upper surfaces curved transversely and capable of jetting air to floatingly support a glass sheet. For producing a dual curved glass sheet, the elevating mechanism is operated to elevate opposed ends of the one in-furnace bed and the out-furnace bed so that these beds jointly form a hill. For producing a single-curved glass sheet, the elevating mechanism is operated to lower the opposed ends of those beds to their original flat positions.

7 Claims, 12 Drawing Sheets

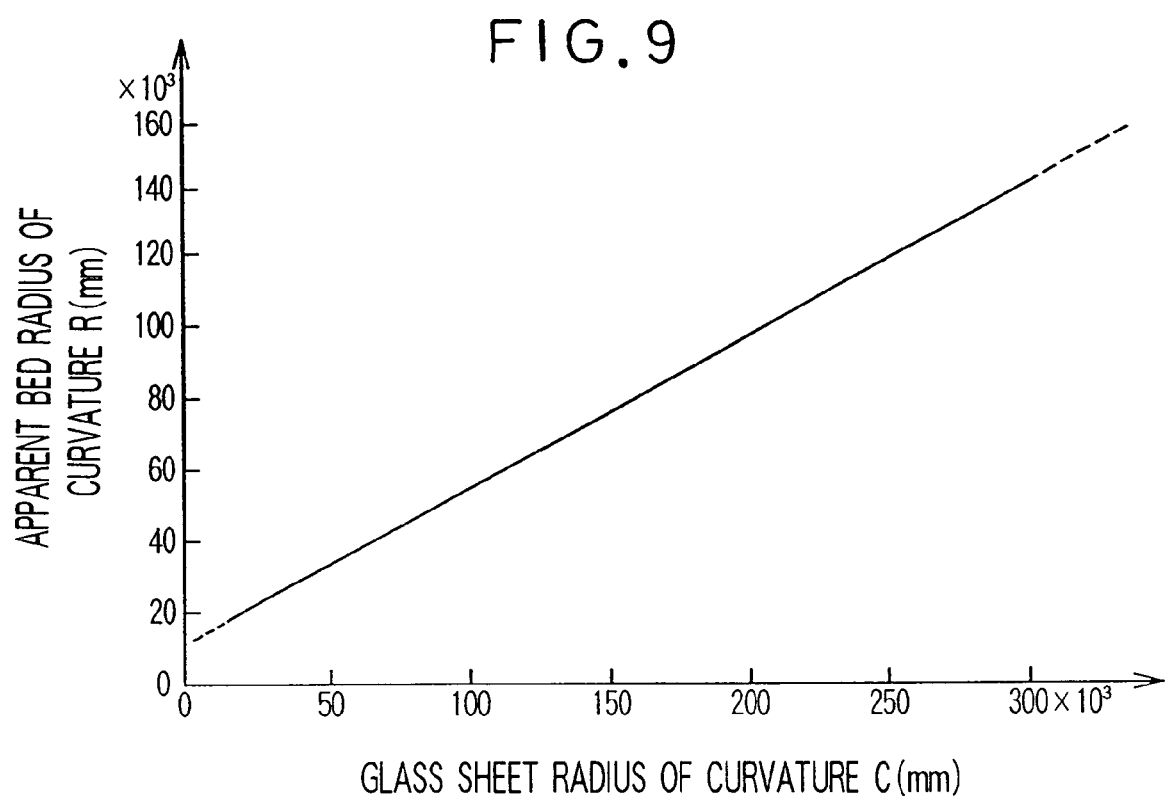

APPARATUS AND METHOD FOR BEND-SHAPING A GLASS SHEET

This application is a divisional of application Ser. No. 09/909,437, filed Jul. 19, 2001, now U.S. Pat. No. 6,725,689, which application(s) are incorporated herein by reference.

BACKGROUND OF THE INVENTION

1. Field of the Invention

The present invention relates to an apparatus and method for bend-shaping a glass sheet into a bi-directionally curved shape.

2. Description of the Prior Art

Many glass sheets for use as automobile side windows are bent in only one direction (hereinafter referred to as "single-curved glass sheet"). Such glass sheets are known from, for example, Japanese Patent Publication No. SHO-43-11768 entitled "METHOD OF TRANSFERRRING HEAT BETWEEN A GLASS SHEET AND GASES FLOWING IN CONTACT WITH THE SHEET" (corresponding to U.S. Pat. No. 3,332,759 and No. 3,332,760).

For design reasons, such side window glass sheets are often required to be bent in two directions, namely, a first direction and a second direction normal to the first direction (hereinafter referred to as "dual-curved glass sheet" and often as "complexly-curved glass sheet"). An apparatus for bend-shaping such a complexly-curved glass sheet is proposed in, for example, Japanese Patent Laid-Open Publication No. HEI-5-009037 "METHOD AND APPARATUS FOR BEND-SHAPING A GLASS SHEET" (corresponding to U.S. Pat. No. 6,014,873). An overall arrangement of the proposed apparatus is schematically illustrated in FIG. 15 hereof.

As shown in FIG. 15, the proposed apparatus includes a heating furnace 150 having an array of beds 151 (only one shown) positioned therein. Air is jetted from upper surfaces 151a of the beds 151 to floatingly support a glass sheet 153 for successively transferring, via a transfer means not shown, the glass sheet 153 over the upper surfaces 151a of the beds 151 in an arrowed direction.

Toward an outlet 150a of the heating furnace 150, the upper surfaces 151a of the beds 151 gradually become curved in a transverse direction (normal to a direction of transfer of the glass sheet 153) so that they have an upwardly convex shape. Thus, as the glass sheet 153 is transferred over the upper surfaces 151a in the arrowed direction, the glass sheet is gradually bent by its own weight (self-sagging) into a shape complementary with the shape of the beds 151 to thereby provide a single-curved glass sheet.

After arrival at a position proximate to the outlet 150a of the heating furnace 150, the single-curved glass sheet 153 advances inclinedly upwardly over beds 155, 156 disposed within the heating furnace (hereinafter called "in-furnace beds") in an upwardly inclined fashion. These beds 155, 156 have respective upper surfaces 155a, 156a curved not only in a transverse direction but also in the direction of transfer of the glass sheet. Thus, transfer of the single-curved glass sheet 153 over those beds 155, 156 causes the glass sheet 153 to become a complexly-curved glass sheet which is bent in both transverse and transfer directions of the glass sheet 153.

Continuously, the complexly-curved glass sheet 153 is transferred to a cooling bed 160 positioned proximately to and externally of the outlet 150a of the heating furnace 150 (hereinafter called "out-furnace bed"), where, while being supported by air jetted from an upper surface 160a of the out-furnace bed 160 in a floated fashion, the complexly-curved glass sheet 153 is cooled by cooling air jetted from cooling means 162 positioned upwardly of the glass sheet 153.

Reference is made next to FIG. 16 illustrating a conventional in-furnace bed on an enlarged scale.

Upper surface 156a of the in-furnace bed 156 is curved both in a direction of its width W and in a direction of its length L. The upper surface 156a of the in-furnace bed 156 has a multiplicity of air jet holes 157. Air is jetted from the air jet holes 157 to floatingly support the single-curved glass sheet 153 over the upper surface 156a, whereupon the glass sheet 153 is bent also in the direction of transfer of the glass sheet to thereby provide the desired dual-curved glass sheet.

Similarly to the upper surface 156a of the in-furnace bed 156, the upper surface 160a of the out-furnace bed 160 shown in FIG. 15 is curved both in a transverse direction and in a direction of transfer of the glass sheet.

Apart from the publication just described, an apparatus for bend-shaping a glass sheet into a dual-curved shape is also disclosed in Japanese Patent Laid-Open Publication No. HEI-6-191867 (U.S. Pat. No. 5,522,912). In the apparatus of this publication, a final bed disposed in heating furnace is curved in a transverse direction but is linear in a direction of transfer of a glass sheet. The final bed has an upper surface of uphill shape, that is, uprising toward an outlet of the heating furnace. In contrast, a quenching bed disposed externally of the heating furnace has an upper surface of downhill shape. Upon transfer from the final bed onto the quenching bed, the glass sheet is formed into a dual-curved glass sheet.

Another method and apparatus for bend-shaping a glass sheet is disclosed in Japanese Patent Laid-Open Publication No. HEI-9-202633. This publication teaches jetting hot air downwardly and combining a downward force produced by the jetted hot air with the weight of a glass sheet being bent to thereby facilitate bending of the glass sheet. As a result, the time required for bending a glass sheet can be shortened. Further, the hot air is jetted downwardly through a gap between an inclined bed and a cooling bed to provide an air curtain which keeps cooling air away from the glass sheet to thereby maintain the glass sheet at its softening temperature.

It is costly to install two lines of manufacture, namely, one for manufacturing the single-curved glass sheet, as described above, and the other for manufacturing the dual-curved glass sheet, as also described above. If a single line of manufacture is made available for use in producing both the single-curved glass sheet and dual-curved glass sheet, this will achieve substantial cost reduction.

For example, the in-furnace beds 155, 156 of the bend-shaping apparatus disclosed in Japanese Patent Laid-Open Publication No. HEI-5-009037, discussed with reference to FIG. 15, may be replaced with new beds 151, 151 curved only in a transverse direction, while the out-furnace bed 160 may be replaced with a bed curved only in a transverse direction. This makes the bend-shaping apparatus available for use in manufacturing a single-curved glass sheet.

Thus, only the bend-shaping apparatus as shown in FIG. 15 may be installed for manufacturing a single-curved glass sheet. When desired, relevant parts of the apparatus may be substituted by other parts to manufacture a dual-curved glass sheet. However, this involves tedious operations to switch the apparatus from one mode of operation to another by replacing the beds for manufacturing a single-curved glass sheet with the beds 155, 156 for manufacturing a dual-curved glass sheet.

Further, upon changing the beds for manufacturing the single-curved glass sheet to the beds 155, 156 for manufacturing the dual-curved glass sheet, it is necessary to lower the temperature of the heating furnace from about 700° C. (glass softening temperature) to an atmospheric temperature. In addition, after the beds for manufacturing the single-curved glass sheet to the beds 155, 156 for manufacturing the dual-curved glass sheet, the temperature within the furnace 150 must be risen to about 700° C. again. Consequently, bed changing takes a relatively long time, thereby deteriorating productivity. Moreover, it is necessary to provide two different types of beds, namely, beds 155, 156, 160 for manufacturing the dual-curved glass sheet and beds for bending the glass sheet, thereby increasing the cost of glass sheet production.

SUMMARY OF THE INVENTION

It is therefore an object of the present invention to provide an apparatus and a method for bend-shaping a glass sheet, which is capable of increasing productivity and reducing installation costs.

According to one aspect of the present invention, there is provided an apparatus for bend-shaping a glass sheet, which comprises: a heating furnace for heating the glass sheet, transferred therethrough along a path of travel thereof, to a substantially softening temperature of the glass sheet, the heating furnace having an inlet positioned upstream of the path of travel and an outlet positioned downstream of the path of travel; a plurality of in-furnace beds disposed within the heating furnace, each of the in-furnace beds having an upper surface of upwardly convex shape with a curvature increasing progressively toward the outlet of the heating furnace, the upper surfaces being designed to jet hot air against the glass sheet to support the glass sheet in a floated state thereover such that the glass sheet bends transversely by its own weight complementarily to the shape of the upper surfaces; at least one out-furnace bed disposed externally of the heating furnace proximately to the outlet of the heating furnace, the out-furnace bed having an upper surface of upwardly convex shape, the in-furnace beds and the out-furnace bed being arranged linearly along the path of travel; and an elevating mechanism, disposed below a downstream end of that one of the in-furnace beds which is positioned proximately to the outlet of the heating furnace and below an upstream end of the out-furnace bed, for elevating the downstream end of the one in-furnace bed and the upstream end of the out-furnace bed to cause the one in-furnace bed and the out-furnace bed to form a hill sloped in a direction along the path of travel, so that upon passage over the hill, the glass sheet bends longitudinally by its own weight complementarily to the shape of the hill, the upper surface of the out-furnace bed being designed to jet cold air against the glass sheet transferred past the outlet of the heating furnace to cool down the glass sheet while supporting the same in a floated state thereover.

By operating the elevating mechanism, the degree of inclination of the uphill formed by the one in-furnace bed and of the downhill formed by the out-furnace bed can be adjusted. Consequently, the dual-curved glass sheet can be readily produced by a simple operation to arrange the one in-furnace bed and the out-furnace bed to form the hill. With the one in-furnace bed and out-furnace bed returned to their original flat positions by operating the elevating mechanism, the bend-shaping apparatus can also be used for bend-shaping a single-curved glass sheet. Stated otherwise, the bend-shaping apparatus as arranged above enables production of both the single-curved glass sheet and dual-curved glass sheet without requiring changing of the beds but by simply causing the one in-furnace bed and the out-furnace bed to be inclined in such a manner as to form the hill. In addition, the beds for producing the single-curved glass sheet can also be used for producing the dual-curved glass sheet. This leads to the advantage that switching from one mode for the production of the single-curved glass sheet to another mode for the production of the dual-curved glass sheet becomes unnecessary.

Desirably, the bend-shaping apparatus further comprises a slide mechanism for sliding at least one of the one in-furnace bed and the out-furnace bed in the direction along the path of travel of the glass sheet. Provision of the slide mechanism makes it possible to move the one in-furnace bed and the out-furnace bed toward one another so that a gap defined between the downstream end of the one in-furnace bed and the upstream end of the out-furnace bed when these beds are arranged to form the hill can be kept to a minimum. This leads to the advantage that the glass sheet can be transferred smoothly from the one in-furnace bed to the out-furnace bed.

Preferably, the one in-furnace bed has a downstream end surface of curved configuration, while the out-furnace bed has an upstream end surface of curved configuration. This enables the downstream end surface of the one in-furnace bed and the upstream end surface of the out-furnace bed to come closer to each other when those beds are arranged to form the hill, thereby further narrowing the gap between the downstream end surface of the one in-furnace bed and the upstream end surface of the out-furnace bed.

Alternatively, the downstream end surface of the one in-furnace bed may have a lower corner while the upstream end surface of the out-furnace bed may have a lower corner, at least one of which lower corners is chamfered. This also enables the downstream end surface of the one in-furnace bed and the upstream end surface of the out-furnace bed to come closer to each other so that the gap defined between those end surfaces when the one in-furnace bed and the out-furnace bed are arranged to form the hill can be kept to a minimum.

In a preferred form, the bend-shaping apparatus further includes a guide roll, disposed in the space defined between the one in-furnace bed and the out-furnace bed, for guiding the glass sheet along the path of travel. This makes it possible to smoothly transfer the glass sheet pulled past the outlet of the heating furnace onto the out-furnace bed.

The guide roll may have a curved configuration conforming to the curved shape of the glass sheet so that the glass sheet can be supported in its entire transverse area by the roll, thereby facilitating smooth transfer of the glass sheet onto the out-furnace.

The bend-shaping apparatus may further includes an air jet nozzle, disposed in the space defined between the one in-furnace bed and the out-furnace bed, for jetting air against the glass sheet to thereby guide the latter along the path of travel. The air jetted from the air jet nozzle makes up for that part of a force for floating the glass sheet that may be lost by arranging the one in-furnace bed and the out-furnace bed in the hill form (inverted V-shape).

According to another aspect of the present invention, there is provided a method for bend-shaping a glass sheet in a bend-shaping apparatus including a heating furnace having an outlet positioned downstream of a path of transfer of the glass sheet, a plurality of in-furnace beds disposed within the heating furnace, at least one out-furnace bed disposed externally of the heating furnace proximately to the outlet in end to end relation to that one of the in-furnace beds which is positioned proximately to the outlet, the in-furnace beds and the out-furnace bed having upper surfaces curved transversely, the method comprising the steps of: elevating a downstream end of the one in-furnace bed and an upstream end of the out-furnace bed to a predetermined bed inclination height H so that the one in-furnace bed and the out-furnace bed jointly form a hill which allows to impart a desired radius of curvature C to the glass sheet, the bed inclination height H being obtained by first determining a first relation between the bed inclination height H and an apparent bed radius of curvature R on a basis of a length L1 of the one in-furnace bed forming an uphill of the hill, a length L2 of the out-furnace bed forming a downhill of the hill, the bed inclination height H, and a length G of the glass sheet in a direction of transfer thereof, and then determining a second relation between the apparent bed radius of curvature R and the radius of curvature C of the glass sheet; heating the glass sheet in the heating furnace to a substantially softening temperature of the glass sheet and jetting hot air from the upper surfaces of the in-furnace beds to floatingly support the glass sheet in such a manner as to allow the glass sheet to bend by own weight thereof transversely complementarily to the shape of the transversely curved in-furnace beds; transferring the transversely bent glass sheet over the hill so that the glass sheet bends longitudinally complementarily to the shape of the hill sloped in the direction of transfer; and transferring the bi-directionally bent glass sheet past the outlet onto the out-furnace bed and jetting cold air from the upper surface of the out-furnace bed to cool the bi-directionally bent glass sheet while floatingly supporting the latter.

By virtue of the hill sloped in the direction of transfer, the glass sheet can be bent in the direction of its transfer upon transfer of the glass sheet over the hill. Further, since the interrelations between the bed inclination height H, apparent bed radius of curvature R, and glass sheet radius of curvature C are pre-determined, the bed inclination height H can be readily obtained from such interrelations. If it were not for such interrelations, the operation to bend the glass sheet in the direction of its transfer becomes tedious and time consuming because repeated adjustments of the bed inclination height H become inevitable and the glass sheet must be checked to see if it has a desired radius of curvature after each adjustment.

Desirably, curvature (1/C) represented as a reciprocal of the glass sheet radius of curvature C falls in a range of $0 < (1/C) < 1 \times 10^{-4}$ mm$^{-1}$. $0 < (1/C)$ is used herein because the glass sheet radius of curvature C becomes infinite when $(1/C)=0$, resulting in the production of a single-curved glass sheet linear in the direction of its transfer. Thus, $0 < (1/C)$ is required for the production of a dual-curved glass sheet. The reason for the adoption of $(1/C) < 1 \times 10^{-4}$ mm$^{-1}$ is that if $(1/C) \geqq 1 \times 10^{-4}$ mm$^{-1}$ is used in its stead, the glass sheet radius of curvature C becomes smaller than $1 \times 10^4$ mm. This makes the bed inclination too excessive and smooth transfer of the glass sheet difficult to achieve. There is also a fear that the lower surface of the glass sheet may be scratched by interfering with the beds laid in an angled fashion. Further, it may also become difficult to smoothly bend the glass sheet in the direction of its transfer. Thus, the vertical movement of the beds is restricted to $(1/C) < 1 \times 10^{-4}$ mm$^{-1}$. As a result, the glass sheet can be prevented from being damaged at a lower surface thereof during its transfer over the hill.

In a preferred form, the relation between the apparent bed radius of curvature R and the glass sheet radius of curvature C is represented by the expression: $R = 0.43 \times C + 12.8 \times 10^3$ (unit: mm). From this expression, the apparent bed radius of curvature can be readily obtained.

The cooling of the glass sheet over the out-furnace bed may comprise air quenching the glass sheet.

BRIEF DESCRIPTION OF THE DRAWINGS

Certain preferred embodiments of the present invention will be described in detail below, byway of example only, with reference to the accompanying drawings, in which:

FIG. 9 is a graph showing a relation between the apparent bed radius of curvature and a glass sheet radius of curvature;

DETAILED DESCRIPTION OF THE PREFERRED EMBODIMENTS

The following description is merely exemplary in nature and is in no way intended to limit the invention, its application or uses.

Figure 1:
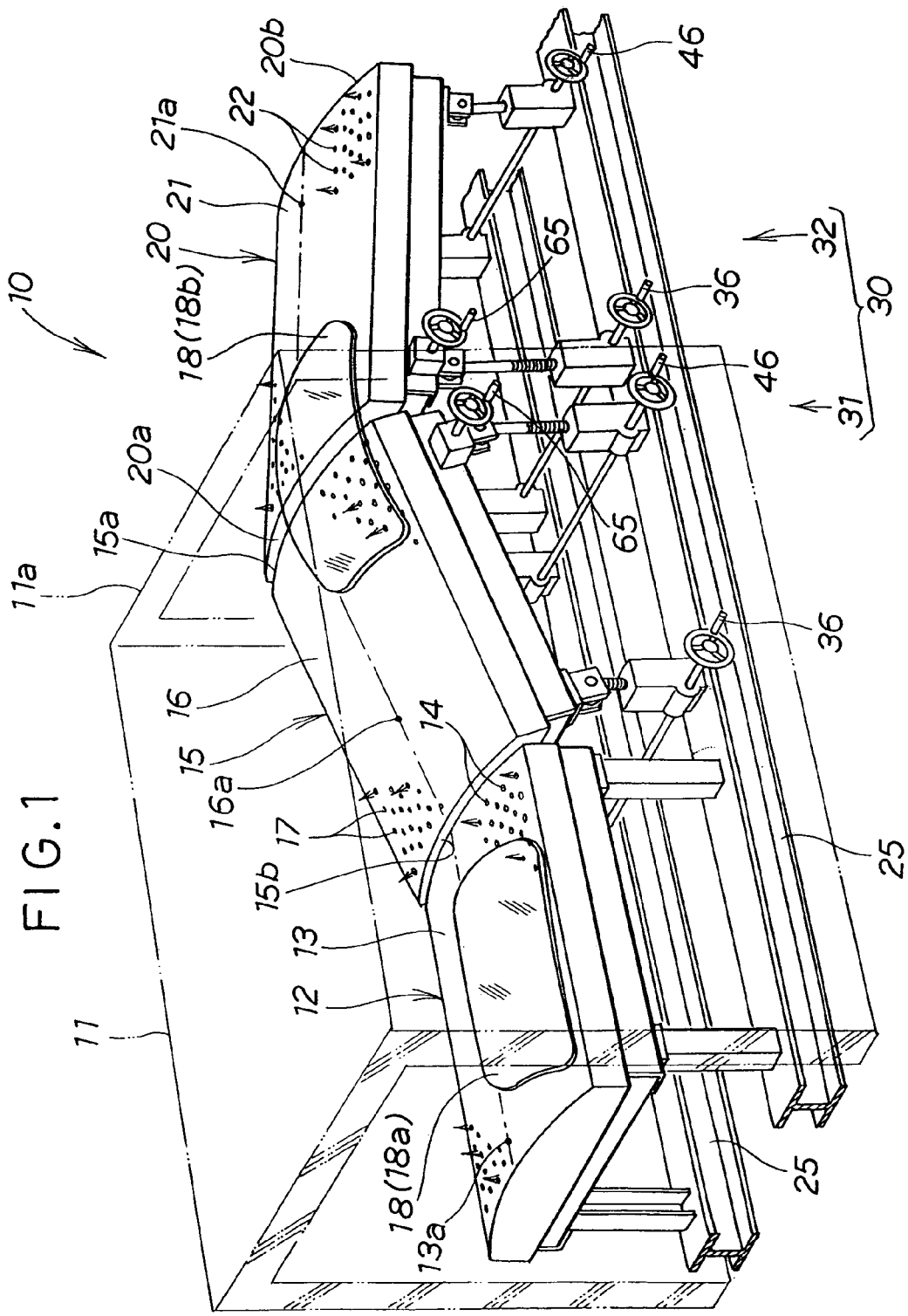
FIG. 1 is a perspective view illustrating the overall arrangement of a bend-shaping apparatus according to a first embodiment of the present invention.

Referring to FIG. 1, an apparatus 10 for bend-shaping a glass sheet, according to the present invention, comprises a heating furnace 11 for heating a glass sheet 18 to a glass softening temperature, a plurality of in-furnace beds 12 (only one shown) positioned within the heating furnace 11 between an inlet (not shown) and an outlet 11a of the furnace 11, and a separate in-furnace bed 15 positioned next to a downstream end one of the in-furnace beds 12 and proximately to the heating furnace outlet 11a.

The in-furnace beds 12, 15 have respective upper surfaces 13, 16 of upwardly convex shape, whose curvatures increase gradually toward the outlet 11a of the heating furnace 11.

Hot air is jetted from the upper surfaces 13, 16 of the in-furnace beds 12, 15 to floatingly support the glass sheet 18. While being held in such a floated state, the glass sheet 18 is transferred over the in-furnace beds 12, 15 toward the outlet 11a of the heating furnace 11, whereupon the glass sheet 18 is gradually bent into the shape of a single-curved glass sheet 18a, which is complementary with the shapes of the upper surfaces 13, 16 of the in-furnace beds 12, 15.

As is apparent from FIG. 1, the bend-shaping apparatus 10 also includes a cooling bed 20 disposed externally of the outlet 11a of the heating furnace 11 proximately to the latter (hereinafter called "out-furnace bed"). As the single-curved glass sheet 18a is transferred past the outlet 11a onto the out-furnace bed 20, the glass sheet 18a is bent in a direction of its transfer, thereby providing a dual-curved glass sheet 18b. Cooling air is then jetted, as indicated by arrows, from an upper surface 21 of the out-furnace bed 20 to cool the glass sheet 18b supported in a floated state.

The glass sheet floating over the upper surfaces 13 of the in-furnace beds 12, the upper surface 16 of the in-furnace bed 15 and the upper surface 21 of the out-furnace bed 20 is transferred over the beds 12, 15, 20 in a direction of its transfer by a transfer mechanism not shown.

In the bend-shaping apparatus 10, at least that one 15 of the in-furnace beds 12, 15 which is positioned proximate to the outlet 11a of the heating furnace 11 has a downstream end 15a elevated to provide an uphill. An upstream end 20a of the out-furnace bed 20 is elevated to form a downhill. Opposed ends of the in- and out-furnace beds 15, 20 can thus be lifted to jointly form a hill by means of an elevating mechanism 30.

Next, the upper surfaces 16, 13 of the in-furnace beds 15, 12 will be discussed in detail.

The upper surface 16 of the in-furnace bed 15 is curved in a transverse direction to provide a ridge line 16a extending vertically centrally thereof. The upper surface 16 also has a multiplicity of air jet holes 17 for jetting hot air against a lower surface of the glass sheet 18 to cause the glass sheet to float over an entire area of the upper surface 16.

The upper surface 13 of the in-furnace bed 12 is transversely curved with a curvature which is substantially zero at its portion proximate to an inlet of the heating furnace 11 but increases progressively toward the outlet 11a of the heating furnace 11. Being thus curved, the upper surface 13 has a ridge 13a extending linearly centrally along the length thereof. The upper surface 13 also has a multiplicity of hot air jet holes 14 for jetting hot air against a lower surface of the glass sheet 18 to cause the glass sheet to float over an entire area of the upper surface 13. The in-furnace bed 12 positioned proximate to the heating furnace outlet 11a may have an upper surface constructed similarly to the upper surface 16 of the in-furnace bed 15.

As already explained, the out-furnace bed 20 is disposed proximately to the outlet 11a of the heating furnace 11. The upper surface 21 of the out-furnace bed 20 is constructed similarly to the upper surface 16 of the in-furnace bed 15 and has a multiplicity of air jet holes 22 for jetting cold air to cool the glass sheet 18 while floating supporting the latter. The upper surface 21 is transversely curved to provide a linear ridge 21a extending centrally along the length thereof.

By virtue of the upper surfaces 16, 21 thus curved in a lateral direction and their respective ridges 16a, 21a extending linearly in a direction of glass transfer, the beds for manufacturing a single-curved glass sheet may be used also for manufacturing a dual-curved glass sheet. That is, the dual-curved glass sheet manufacture is enabled by operating the elevating mechanism 30 to raise the downstream end 15a of the in-furnace bed 15 and the upstream end 20a of the out-furnace bed 20 such that the in- and out-furnace beds 15, 20 jointly form a hill sloped in a direction of glass transfer. For bend-shaping the single-curved glass sheet 18a with the in- and out-furnace beds 15, 20, the downstream and upstream ends 15a, 20a of the beds 15, 20 may be brought down to their original positions by means of the elevating means 30.

As can be appreciated from FIG. 1, the elevating means 30 comprises a first elevating mechanism 31 for vertically moving the downstream and upstream ends 15a and 15b of the in-furnace bed 15 and a second elevating mechanism 32 for vertically moving the upstream and downstream ends 20a and 20b of the out-furnace bed 20. The first elevating mechanism 31 and the second elevating mechanism 32 have the same construction. Thus, in the following discussion, only the second elevating mechanism 32 will be referenced and discussion as to the first elevating mechanism 31 will be omitted.

Figure 2:
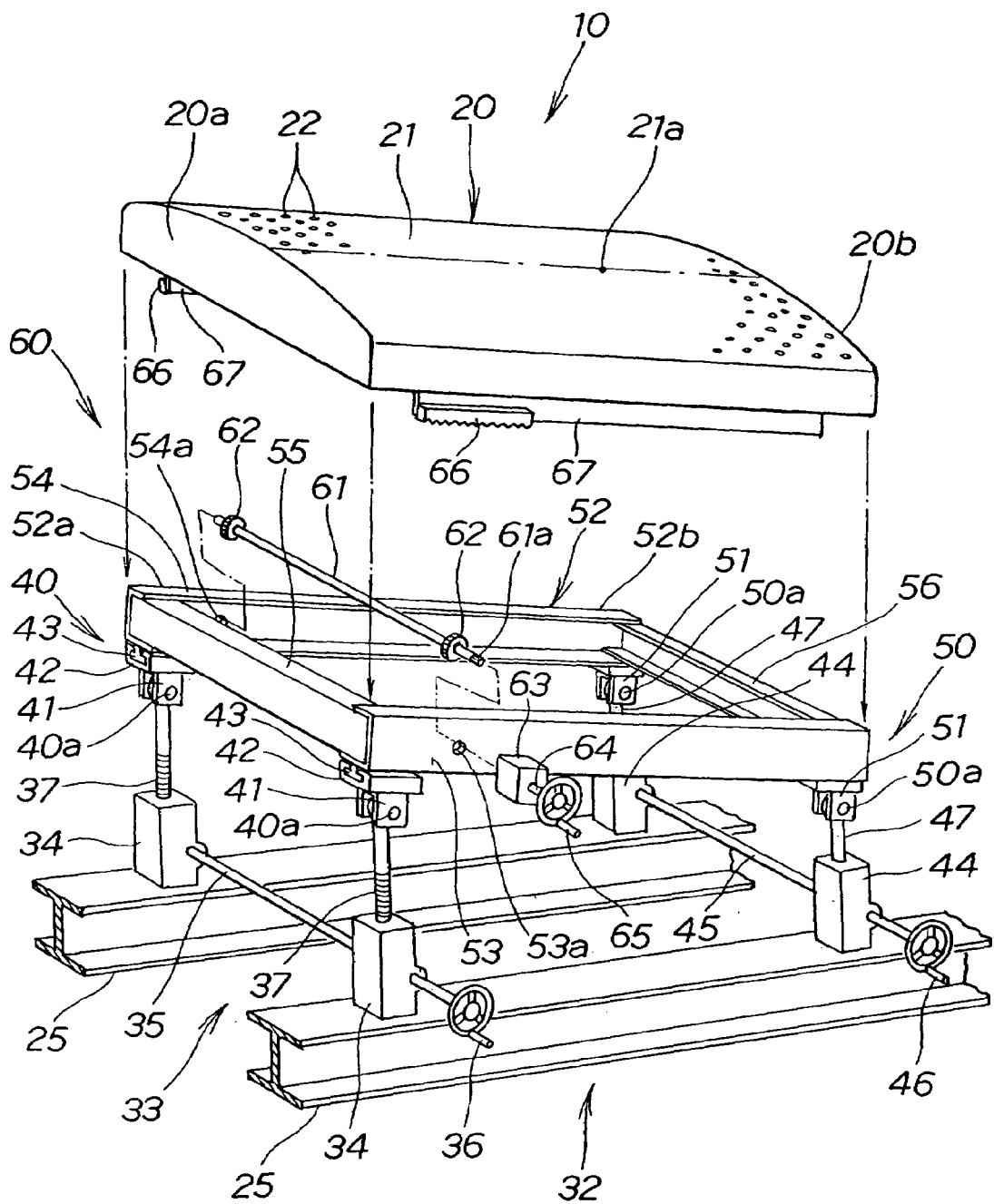
FIG. 2 is an exploded perspective view showing, on an enlarged scale, an out-furnace bed and a second elevating mechanism of the apparatus shown in FIG. 1.

Reference is now made to FIG. 2 illustrating in exploded perspective the glass bend-shaping apparatus according to the present invention, in particular relation with the out-furnace bed 20 and the second elevating mechanism 32.

As shown in FIG. 2, the second elevating mechanism 32 comprises a jack unit 33 for vertically moving the upstream and downstream ends 20a, 20b of the out-furnace bed 20, and a slide mechanism 60 disposed between the jack unit 33 and the out-furnace bed 20.

The jack unit 33 comprises a pair of front jacks 34, 34 and a pair of rear jacks 44, 44, each disposed on respective support bases 25, 25. The front jacks 34, 34 are operatively connected via a front drive rod 35 having at one end thereof an operation handle 36 for operating the front jacks 34, 34. Similarly, the rear jacks 44, 44 are operatively connected via a rear drive rod 45 having at one end thereof a rear operation handle 46 for operating the rear jacks 44, 44. The front jacks 34, 34 include respective lifting rods 37, 37 having upper ends connected to a table 52 via a front connecting portion 40. Similarly, the rear jacks 44, 44 include respective lifting rods 47, 47 having upper ends connected to the table 52 via a rear connecting portion 50.

The connecting portion 40 includes brackets 41, 41 connected to the respective upper ends of the lifting rods 37, 37 by means of pins 40a, 40a, guides 42, 42 connected to the respective guides 42, 42, and rails 43, 43 mounted to an inlet end 52a of the table 52 and slidably received in the respective guides 42, 42.

Similarly, the connecting portion 50 includes brackets 51, 51 connected to the respective upper ends of the lifting rods 47, 47 by means of pins 50a, 50a and to an outlet end 52b of the table 52.

In the jack unit 33, by turning the operation handle 36 to cause the front drive rod 35 to turn clockwise or counterclockwise, the lifting rods 37, 37 simultaneously move vertically upwardly to thereby lift the inlet end side of the table 52. By turning the rear operation handle 46 to cause the rear drive rod 45 to turn clockwise or counterclockwise, the lifting rods 47, 47 simultaneously move vertically upwardly to thereby lift the outlet end side of the table 52.

By virtue of the guides 42, 42 and rails 43, 43 provided at the front connecting portion 40, positional displacement of the table 52, which occurs when the table 52 is inclined, can be adjusted or cured.

The table 52 comprises right and left frames 53, 54 having inlet side ends interconnected by an inlet side frame 55 and outlet side ends interconnected by an outlet side frame 56 such that it has a rectangular configuration. The right and left frames 53, 54 have through-holes 53a, 54a for supporting a rotary shaft 61 of the slide mechanism 60.

The rotary shaft 61 of the slide mechanism 60 has pinions 62, 62 provided at opposed ends thereof. The rotary shaft 61 is supported on the right and left frames 53, 54 with the opposed ends rotatably received in the respective through-holes 53a, 54a. The rotary shaft 61 also includes a spline 61a meshed with a reduction gear 63 disposed sidewardly of the right frame 53. The reduction gear 63 includes a drive shaft 64 having an operational handle at its end remote from the reduction gear 63. The right and left pinions 62 are brought into meshing engagement with respective racks 66, 66 carried on guides 67, 67 mounted to an underside of the out-furnace bed 20. The guides 67, 67 are mounted to rails, not shown, of an underside of the out-furnace bed 20. The guides 67, 67 are also slidably disposed on rails, not shown, of the right and left frames 53, 54.

In the slide mechanism 60, by turning the operational handle 65, the rotary shaft 61 is turned together with the pinions 62, 62 to cause the right and left racks 66, 66 to move horizontally. This causes the out-furnace bed 20 to move horizontally through the guides 67, 67.

As a result, a space between the downstream end 15a of the in-furnace bed 15 and the upstream end 20a of the out-furnace bed 20 becomes small, thereby achieving smooth transfer of the glass sheet 18 from the in-furnace bed 15 to the out-furnace bed 20.

With reference to FIG. 3A to FIG. 5, discussion will be made next as to a method for bend-shaping the glass sheet in the bend-shaping apparatus 10.

Figure 3A:
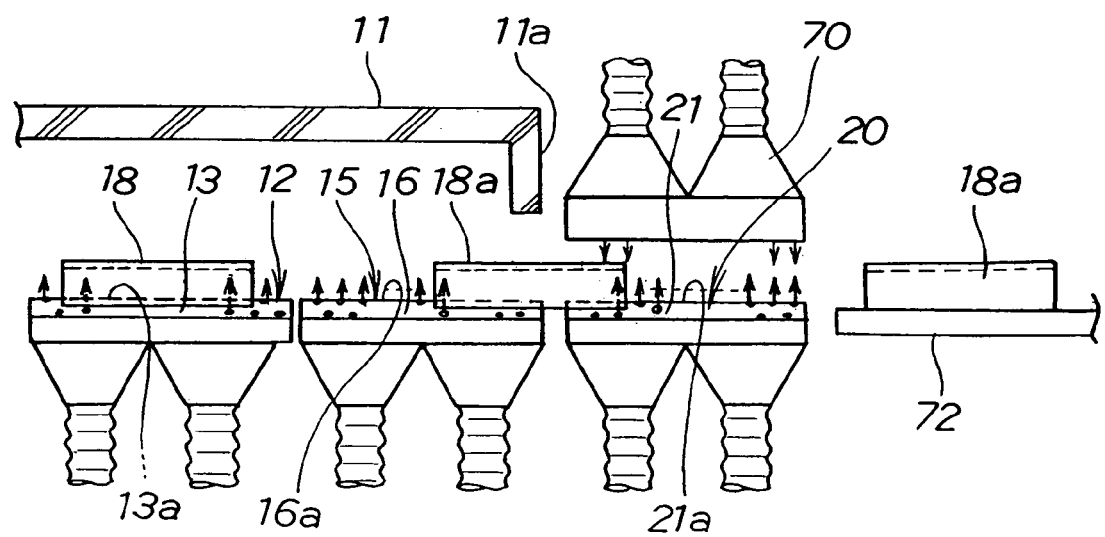
FIGS. 3A and 3B are side elevational views showing a first phase of a bend-shaping method according to the present invention.

Referring now to FIG. 3A, with the in-furnace bed 15 and the out-furnace bed 20 laid flat by operating the first and second elevating mechanisms 31, 32 (FIG. 1), the glass sheet 18 is shaped into a curved shape. That is, the glass sheet 18 is floatingly supported over the in-furnace bed 15 by hot air jetted as arrowed from the upper surface 13 of the in-furnace bed 15 and is then transferred in such a state along the in-furnace bed 12. The glass sheet 18 is then heated to a softening point in the heating furnace 11 so that it becomes a single-curved glass sheet 18a bent by its own weight to conform to the upper surface 16 of the in-furnace bed 15.

Then, the glass sheet 18a is pulled out from the heating furnace 11 and transferred onto the out-furnace bed 20, where it is floatingly supported thereover by cold air jetted from the surface 21 of the out-furnace bed 20 against a lower surface thereof and cooled down by cooling air jetted as arrowed from a cooling unit 70 against an upper surface of the glass sheet 18a, thereby forcedly air quenching the glass sheet 18a.

Figure 3B:
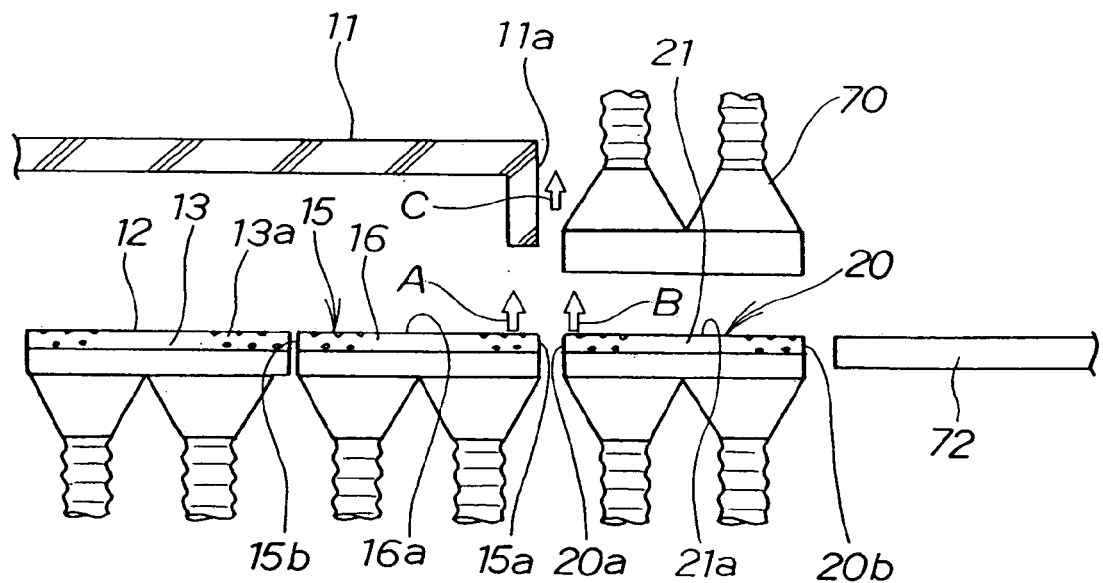

Turning now to FIG. 3B, the downstream end 15a of the in-furnace bed 15 is lifted as shown by arrow A by turning the rear operational handle 46 (see FIG. 1) of the first elevating mechanism 31 to a predetermined position. Then, the upstream end 15b of the in-furnace bed 15 is lifted by turning the front operational handle 36 of the first elevating mechanism 31 up to a position as high as the in-furnace bed 12.

Next, the upstream end 20a of the out-furnace bed 20 is lifted as shown by arrow B by turning the front operational handle 36 (FIG. 1) of the second elevating mechanism 32 up to a position as high as the downstream end 15a of the in-furnace bed 15. Thereafter, the downstream end 20b of the out-furnace bed 20 is lifted by turning the rear operational handle 46 of the second elevating mechanism 32 up to a position as high as a transfer table 72.

After height adjustment of the in- and out-furnace beds 15, 20 as described above is completed, that side of the cooling unit 70 proximate to the heating furnace 11 is elevated as shown by arrow C. Height of the cooling unit 70 may be set to be applicable for both single-curved glass sheet manufacture process and dual-curved glass sheet manufacture processes so that operations for lifting the cooling unit 70 can be omitted.

Figure 4A:
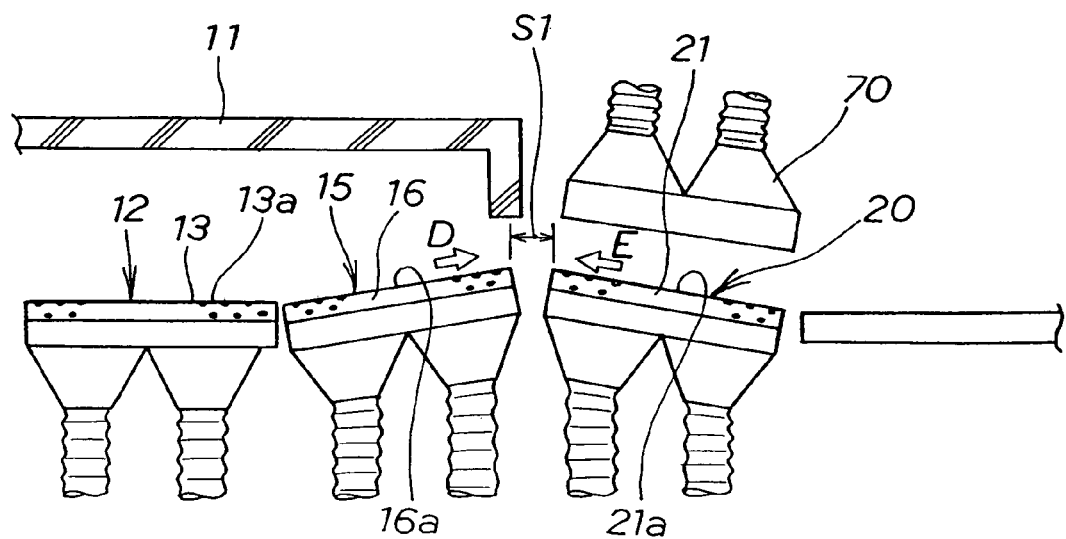
FIGS. 4A and 4B are side elevational views showing a second phase of the bend-shaping method.

Referring now to FIG. 4A, the in- and out-furnace beds 15, 20 are laid in an angled fashion, that is, to form a hill, with a relatively large space S1 left therebetween. The cooling unit 70 may be inclined in correspondence with the out-furnace bed 20.

Figure 4B:
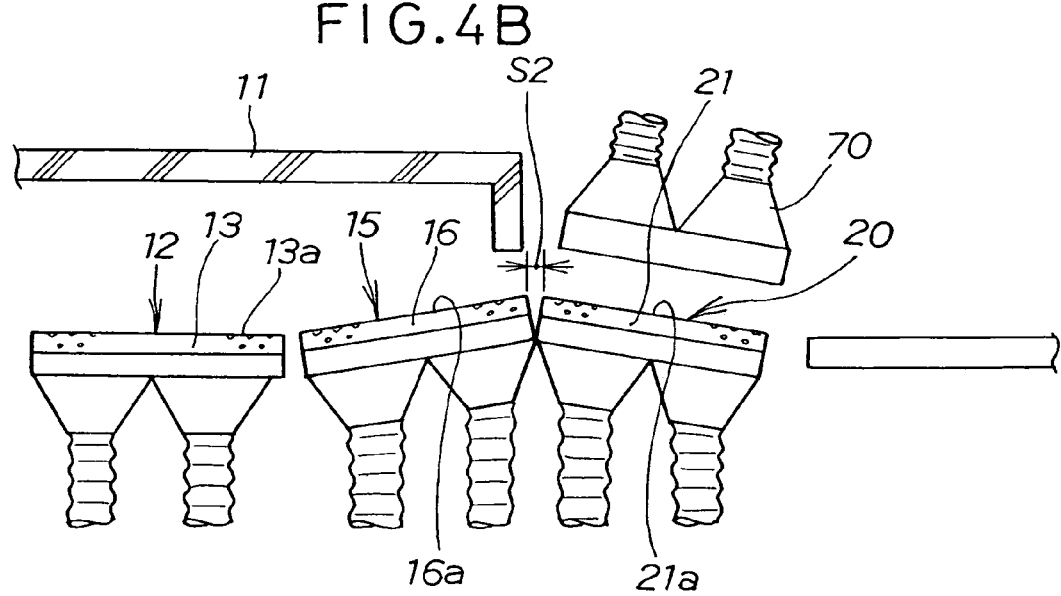

In this state, the operational handle 65 (see FIG. 1) of the first elevating mechanism 31 is turned to cause the in-furnace bed 15 to slide in a direction shown by arrow D. This is followed by turning the operational handle 65 (see FIG. 1) of the second elevating mechanism 32 to cause the out-furnace bed 20 to slide in a direction shown by arrow E. Such sliding of the in- and out-furnace beds 15, 20 makes the space between those beds 15, 20 as small as S2, as shown in FIG. 4B.

Figure 5:
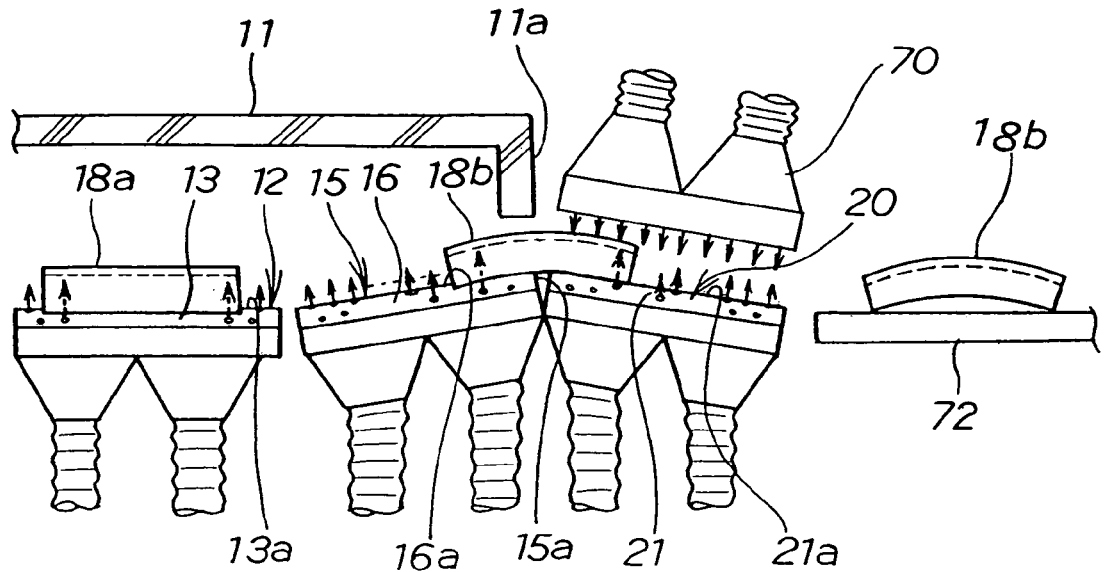
FIG. 5 is a side elevational view showing a third phase of the bend-shaping method.

Turning now to FIG. 5, the glass sheet 18 is floatingly supported over the in-furnace bed 12 by hot air jetted from the upper surface 13 of the in-furnace bed 12 as arrowed and is transferred in such a state along the in-furnace bed 12. While being held in such a state, the glass sheet 18 is heated in the heating furnace 11 to a softening temperature so that the glass sheet 18 can be bent by its own weight into a single-curved glass sheet 18a conforming to the shape of the upper surface 13 of the in-furnace bed 12.

Upon transfer of the thus-formed single-curved glass sheet 18a from the downstream end 15a of the in-furnace bed 15 onto the out-furnace bed 20, since the in-furnace bed 15 and the out-furnace bed 20 are laid in an angled fashion, that is, to form a hill, the single-curved glass sheet 18a is bent by its own weight in a direction of its transfer or a longitudinal direction. This provides a dual-curved glass sheet 18b bent in two directions, namely, transverse and longitudinal directions.

The thus-formed dual-curved glass sheet 18b is transferred onto the out-furnace bed 20. At this time, the in-furnace bed 15 and the out-furnace bed 20 are slidingly moved to come closer to each other to make the space between the downstream end 15a of the in-furnace bed 15 and the upstream end 20a of the out-furnace bed 20 as small as possible so that the glass sheet can be transferred smoothly from the in-furnace bed 15 to the out-furnace bed 20, thereby preventing a lower surface of the glass sheet from being scratched.

After the glass sheet 18b is transferred onto the out-furnace bed 20, cold air is jetted as arrowed from the upper surface 21 of the out-furnace bed 20 to floatingly support the glass sheet 18b over the out-furnace bed 20. At the same time, cooling air is jetted from the cooling unit 70 against an upper surface of the glass sheet 18b to forcedly air quench the glass sheet 18b. The thus-quenched glass sheet 18b is further cooled down by atmospheric air while it is transferred by means of the transfer table 72. By such air quenching, the dual-curved glass sheet 18b is made to retain its dual-curved shape and is tempered.

In the glass sheet bend-shaping method described in relation to FIG. 3A to FIG. 5, the in-furnace bed 15 and the out-furnace bed 20 have their upper surfaces 16, 21 bent in a transverse direction and ridgelines 16a, 21a extending linearly. This enables shaping of the glass sheet 18 into the single-curved glass sheet by arranging the in- and out-furnace beds 15, 20 to lie horizontally.

By elevating the downstream end 15a of the in-furnace bed 15 and the upstream end 20a of the out-furnace bed 20 to a predetermined height, shaping of the glass sheet 18 into the dual-curved glass sheet is enabled. Consequently, by simple operations such as adjusting the heights of the downstream end 15a of the in-furnace bed 15 and the upstream end 20a of the out-furnace bed 20, both the single-curved glass sheet 18 and the dual-curved glass sheet 18b can be manufactured.

Discussion will be made next as to the radius of curvature of the dual-curved glass sheet in a direction of its transfer with reference to FIGS. 6 to 9.

Figure 6:
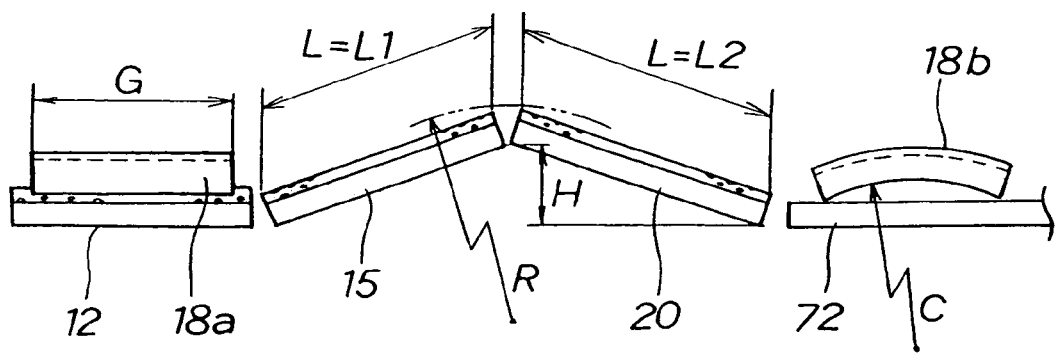
FIG. 6 is a schematic side elevational view showing the dimensions of component parts of the bend-shaping apparatus.

In FIG. 6, the bend-shaping apparatus of the present invention is shown in schematic side elevation with dimensions of components thereof. The dual-curved glass sheet 18b has a radius of curvature C taken in a direction of its transfer. The radius of curvature C is determined by apparent bed radius of curvature R, which in turn is determined by lengths L1, L2 of the beds 15, 20, inclination heights H of the beds 15, 20, and a length G of the glass sheet 18. The term "inclination height" represents a height from an original flat position to an elevated position of the beds, as shown by H in FIG. 6. Relations between these determining factors will be described with reference to graphs later on.

In the embodiment being described, L1 is set to be equal to L2. Thus, the bed lengths L1 and L2 will be represented below simply by L for clarity. Note also that the following description will be made as to an example wherein a single one of each of the in-furnace bed 15 and out-furnace bed 20 is used to form a hill. Alternatively, plural in-furnace beds 15 and out-furnace beds 20 may be used to form such a hill, in which instance the entire length of whole beds should correspond to the bed length L. Desirably, the glass length G and bed length L are set to be G<L.

Figure 7:
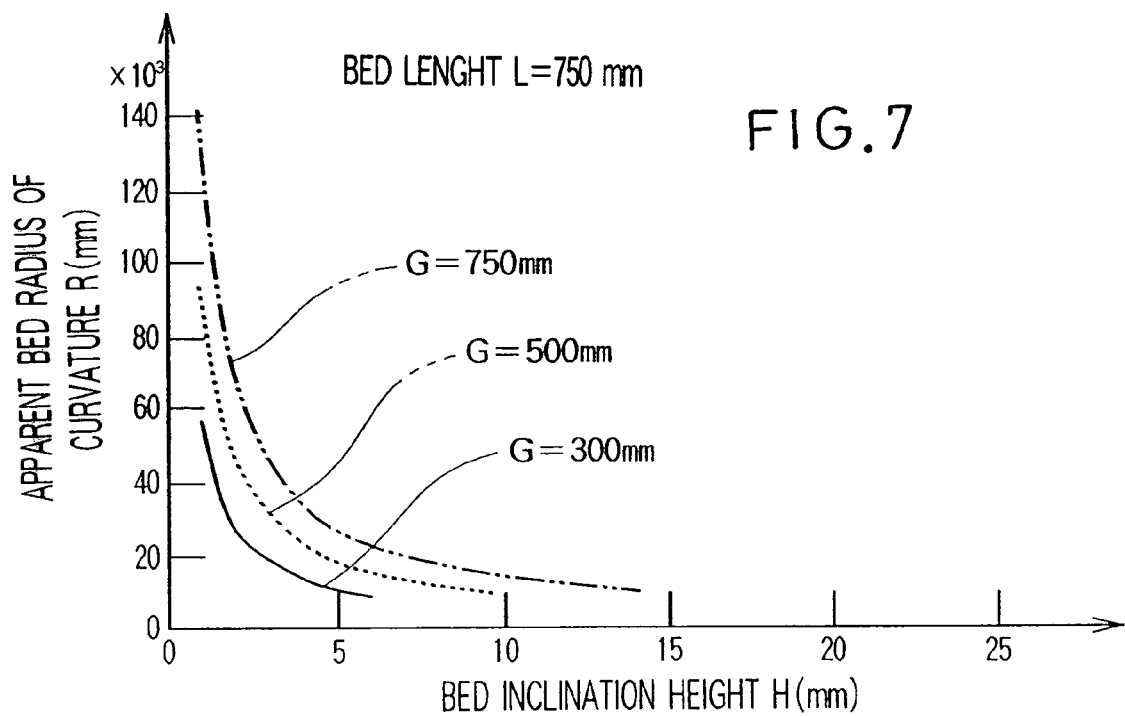
FIG. 7 is a graph illustrating a relation between an apparent bed radius of curvature and a bed inclination height when a bed length is 750 mm.

Reference is now made to the graph of FIG. 7 showing a relation between the apparent bed radius of curvature R and bed inclination height H, wherein the beds 15, 20 have a length L of 750 mm. The apparent bed radius of curvature R (mm) is shown on the vertical axis while the bed inclination height H (mm) is shown on the horizontal axis. The solid line indicates the glass sheet having a length of 300 mm. The broken line represents the glass sheet having a length of 500 mm. The double-dot-and-single-dash line indicates the glass sheet having a length of 750 mm.

Assume that each bed has an inclination height H of, e.g., 5 mm. Then, the apparent bed radius of curvature R is expressed by:

$R=12\times10^3$ mm, where the glass sheet has a length G of 300 mm;

$R=18\times10^3$ mm, where the glass sheet has a length G of 500 mm; and $R=26\times10^3$ mm, where the glass sheet has a length G of 750 mm.

That is, the larger the glass sheet length G becomes, the larger the apparent bed radius of curvature R becomes. As a result, the curvature of the dual-curved glass sheet 18b becomes small.

In the case where the glass sheet length G is 750 mm, the apparent bed radius of curvature R is $15\times10^3$ mm when the bed inclination height H is 10 mm. The apparent bed radius of curvature R is $26\times10^3$ mm when the bed inclination height H is 5 mm. That is, the larger the bed inclination height H becomes larger, the smaller the apparent bed radius of curvature R becomes. As a result, the curvature of the dual-curved glass sheet 18b becomes larger.

Figure 8:
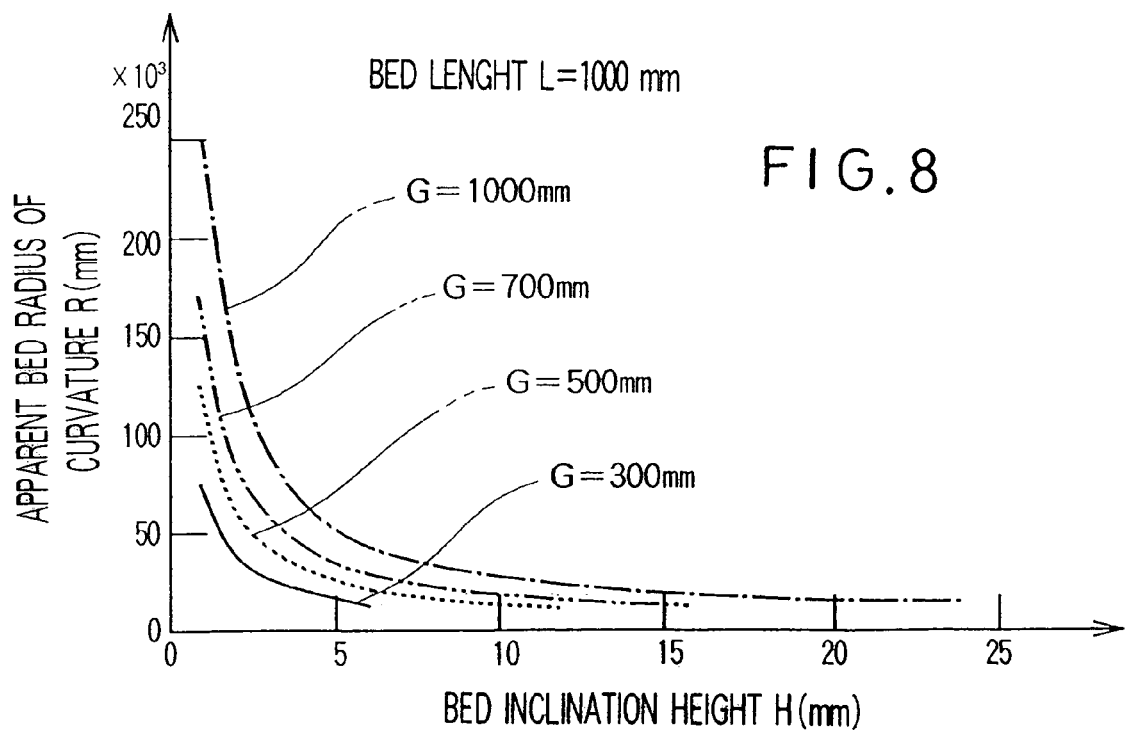
FIG. 8 is a graph showing a relation between the apparent bed radius of curvature and bend inclination height when the bed length is 1,000 mm.

Reference is made next to the graph of FIG. 8 showing a relation between the apparent bed radius of curvature R and the bed inclination height H when the beds 15, 20 are 1,000 mm long. The apparent bed radius of curvature R (mm) is shown on the vertical axis while the bed inclination height H (mm) is shown on the horizontal axis. The solid line indicates the glass sheet having a length of 300 mm. The broken line represents the glass sheet having a length of 500 mm. The double-dot-and-single-dash line indicates the glass sheet having a length of 700 mm. The single-dot-and-single-dash line represents the glass sheet having a length of 1,000 mm.

Assume that each bed has an inclination height H of, e.g., 5 mm. Then, the apparent bed radius of curvature R is expressed by:

$R=15\times10^3$ mm, where the glass sheet length G is 300 mm;

$R=25\times10^3$ mm, where the glass sheet length G is 500 mm; and $R=35\times10^3$ mm, where the glass sheet length G is 700 mm.

That is, similarly to the case of FIG. 7, the larger the glass sheet length G becomes, the larger the apparent bed radius of curvature R becomes. As a result, the curvature or the curve of the dual-curved glass sheet 18b becomes small.

Now, taking the bed inclination height H of 5 mm, as an example, comparison is made between the apparent bed radius of curvature R in the case where a bed length L is 700 mm (the graph of FIG. 7) and the apparent bed radius of curvature R in the case where a bed length L is 1,000 mm (the graph of FIG. 8).

When the glass sheet length G is 300 mm, the apparent bed radius of curvature R is $12\times10^3$ mm in the case where the bed length L is 750 mm while this is $15\times10^3$ mm in the case where the bed length L is 1,000 mm. When the glass sheet length G is 500 mm, the apparent bed radius of curvature R is $18\times10^3$ mm in the case where the bed length L is 750 mm while this is $25\times10^3$ mm in the case where the bed length L is 1,000 mm. Thus, with the bed inclination height H kept the same, the smaller the bed length L becomes, the smaller the apparent bed radius of curvature R becomes, causing the curvature of the dual-curved glass sheet 18b to grow larger.

In the glass sheet having the length G of 700 mm as shown in the graph of FIG. 8, the apparent bed radius of curvature R is $15\times10^3$ mm when the bed inclination height H is 10 mm and is $26\times10^3$ mm when the bed inclination height H is 5 mm. That is, the larger the bed inclination height H becomes, the smaller the apparent bed radius of curvature R becomes, causing the curvature of the dual-curved glass sheet 18b to grow larger.

As can be appreciated from the discussion just made and the graphs of FIGS. 7 and 8, the apparent bed radius of curvature R is determined by the lengths L and inclination heights H of the beds 15, 20 and the glass sheet length G. Although the foregoing discussion has been made in relation to the case where the in- and out-furnace beds 15, 20 have the same length L, the same can be applied to the case where the in- and out-furnace beds 15, 20 have different lengths.

Reference is made next to the graph of FIG. 9 showing a relation between the apparent bed radius of curvature R and the radius of curvature C of the glass sheet. In the graph, the apparent bed radius of curvature R (mm) is shown on the vertical axis while glass sheet radius of curvature C (mm) is shown on the horizontal axis.

From the graph, it can be appreciated that the relation expressed by $R=0.43 \times C+12.8 \times 10^3$ (Expression 1) is established. The unit used herein is mm.

Consequently, for manufacturing a dual-curved glass sheet having the radius of curvature C of, e.g., $100 \times 10^3$ mm, the apparent bed radius of curvature R may be set to be $R=55.8 \times 10^3$ mm. Similarly, for manufacturing a dual-curved glass sheet having a radius of curvature C of $200 \times 10^3$ mm, the apparent bed radius of curvature R may be set to be $R=98.8 \times 10^3$ mm.

By thus adjusting the apparent bed radius of curvature R, the radius of curvature C of the glass sheet is determined. In other words, adjustment of the apparent bed radius of curvature R enables adjustment such that the desired bending of the glass sheet in the direction of transfer of the glass sheet can be achieved. In addition, by getting the relation of Expression 1 readied in advance, it becomes possible to readily obtain the apparent bed radius of curvature R corresponding to the radius of curvature C of the glass sheet.

The relation of Expression 1, that is, $R=0.43 \times C+12.8 \times 10^3$ mm, becomes possible when the radius of curvature C of the glass sheet falls in a range of $10 \times 10^3$ mm$<C<\infty$. Curvature of the glass sheet is represented as a reciprocal (1/C) of the glass sheet radius of curvature C and falls in a range of $0<(1/C)<1 \times 10^{-4}$ mm$^{-1}$ (Expression 2).

$0<(1/C)$ is used herein because the glass sheet radius of curvature C becomes $\infty$ (infinite) when $(1/C)=0$, resulting in the production of a single-curved glass sheet linear in the direction of its transfer. Thus, $0<(1/C)$ is required for the production of a dual-curved glass sheet. The reason for the adoption of $(1/C)<1 \times 10^{-4}$ mm$^{-1}$ is that if $(1/C) \geq 1 \times 10^{-4}$ mm$^{-1}$ is used in its stead, the glass sheet radius of curvature C becomes smaller than $1 \times 10^4$ mm. This makes the bed inclination too excessive and smooth transfer of the glass sheet difficult to achieve. There is also a fear that the lower surface of the glass sheet may be scratched by interfering with the beds laid in an angled fashion. Further, it may also become difficult to smoothly bend the glass sheet in the direction of its transfer. Thus, the vertical movement of the beds is restricted to $(1/C)<1 \times 10^{-4}$ mm$^{-1}$.

In the preferred embodiment explained thus far in relation to FIGS. 7 to 9, the relation between the inclination height H of the in- and out-furnace beds 15, 20 and the apparent bed radius of curvature R and the relation between the apparent bed radius of curvature R and the glass sheet radius of curvature C are obtained in advance. This makes it possible to determine the inclination height H of the in- and out-furnace beds 15, 20 for eventually obtaining the desired radius of curvature C of the glass sheet. Consequently, the inclination height H of the beds 15, 20 can be readily obtained in correspondence with the glass sheet radius of curvature C. As a result, the desired glass sheet radius of curvature C can be readily obtained.

In the graph of FIG. 9, the glass sheet radius of curvature C is shown to fall in the range of $10 \times 10^3$ mm to $300 \times 10^3$ mm. However, in the method and apparatus according to the present invention, it is possible to manufacture a dual-curved glass sheet with a radius of curvature C in the direction of transfer of the glass sheet, ranging from $10 \times 10^3$ mm to $\infty$ mm. An infinite ($\infty$) is applicable to a single-curved glass sheet.

Discussion will be made next as to second to fifth embodiments of the present invention with reference to FIG. 10A to FIG. 14. Throughout these Figures, like components will be designated by like reference numerals and their description will be omitted.

Figure 10A:
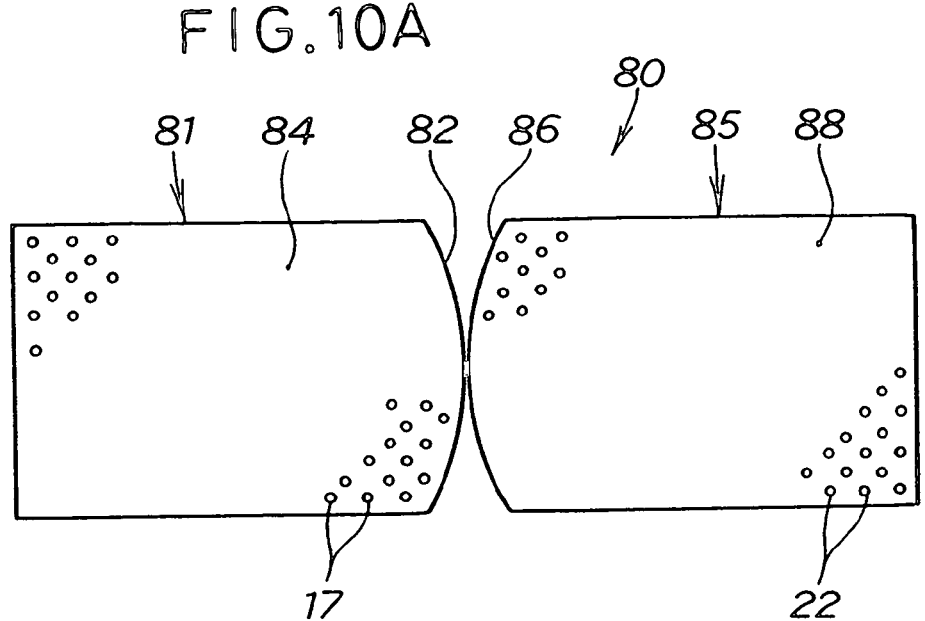
FIGS. 10A and 10B are schematic views showing relevant parts of a bend-shaping apparatus according to a second embodiment of the present invention.

As shown in FIG. 10A, a bend-shaping apparatus 80 according to the second embodiment of the present invention includes an in-furnace bed 81 and an out-furnace bed 85, which are laid flat. These beds 81, 85 have respective downstream end surface 82 and upstream end surface 86, which are opposed to each other. The downstream end surface 82 of the in-furnace bed 81 has a curved configuration and is chamfered at a lower corner thereof. Similarly, the upstream end surface 86 of the out-furnace bed 85 has a curved configuration and is chamfered at a lower corner thereof. Other parts and components are identical to those of the bend-shaping apparatus 10 according to the first embodiment.

Chamfering the lower corner of the downstream end surface 82 of the in-furnace bed 81 makes the end surface 82 acutely angled as indicated by θ with respect to an upper surface 84 of the bed 81. Similarly, chamfering of the lower corner of the upstream end surface 86 of the out-furnace bed 85 makes the end surface 86 acutely angled as indicated by θ with respect to an upper surface 88 of the bed 85.

Figure 10B:
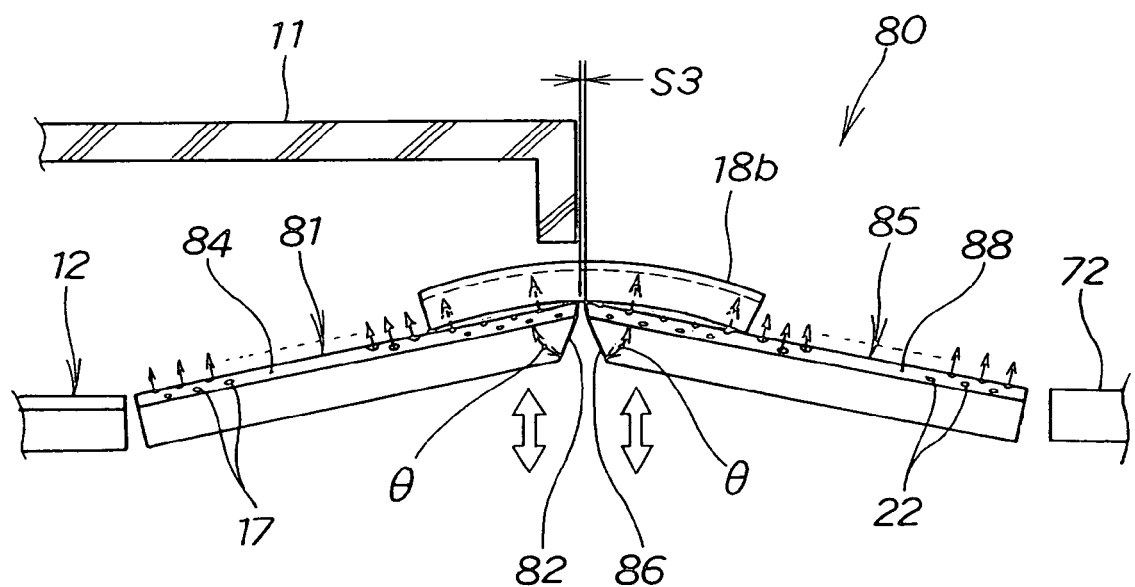

This makes it possible to raise the downstream end surface 82 of the in-furnace bed 81 and to avoid interference which occurs between the downstream end surface 82 of the in-furnace bed 81 and the upstream end surface 86 of the out-furnace bed 85 when the upstream end surface 86 is elevated. As a result, it becomes possible to make a space S3 between the downstream end surface 82 and the upstream end surface 86 small, as shown in FIG. 10B. Since the dual-curved glass sheet 18b can thus be transferred smoothly from the in-furnace bed 81 to the out-furnace bed 85, the lower surface of the dual-curved glass sheet 18b can be prevented from being scratched during transfer.

Figure 11:
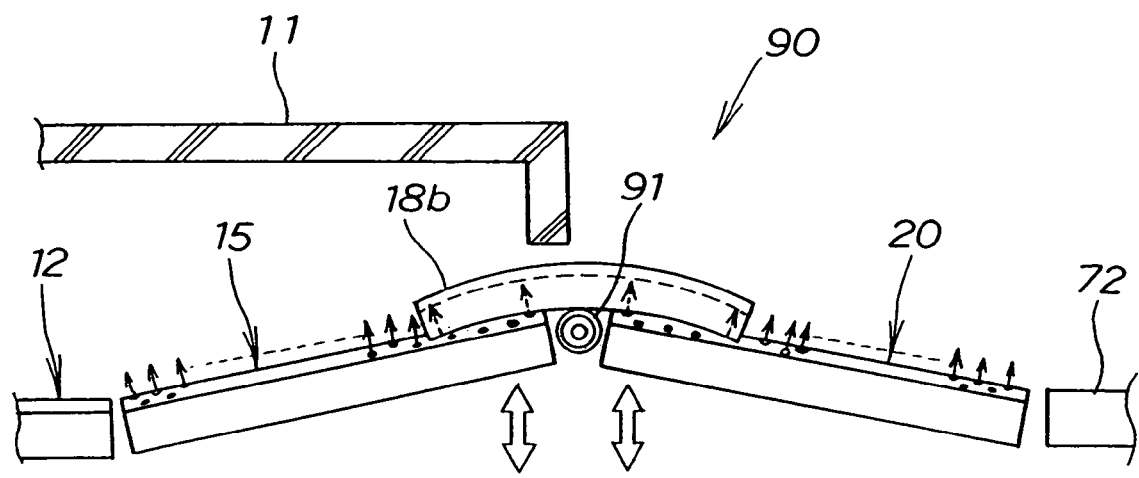
FIG. 11 is a schematic side elevational view showing relevant parts of a bend-shaping apparatus according to a third embodiment of the present invention.

Turning now to FIG. 11, a bend-shaping apparatus 90 according to the third embodiment of the present invention includes a guide roll 91 disposed in the space defined between the in-furnace bed 15 and the out-furnace bed 20 for guiding the dual-curved glass sheet 18b. Apart from the guide roll 91, the apparatus 90 is constructed identically to the apparatus 10 according to the first embodiment. Provision of the guide roll 91 enables guided smooth transfer of the dual-curved glass sheet 18b from a downstream end of the in-furnace bed 15 onto the out-furnace bed 20. As a result, damaging of the lower surface of the glass sheet 18b can be prevented.

More specifically, the guide roll 91 is arranged such that it can be vertically moved by an elevating means, not shown, to correspond or harmonize with the elevated in- and out-furnace beds 15, 20. The guide roll 91 may be detachably mounted to the apparatus so that it can be detached when the in- and out-furnace beds 15, 20 are laid flat. The guide roll 92 may be heated so as to prevent the dual-curved glass sheet 18b from being cooled thereby.

Figure 12:
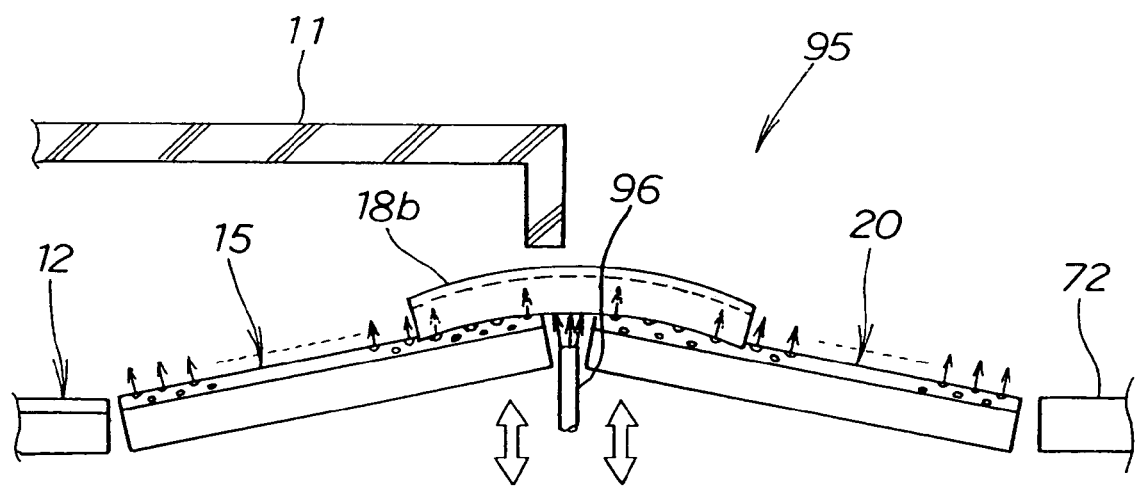
FIG. 12 is a schematic side elevational view showing relevant parts of a bend-shaping apparatus according to a fourth embodiment of the present invention.

As shown in FIG. 12, a bend-shaping apparatus 95 according to the fourth embodiment of the present invention includes an air jet nozzle 96 disposed in the space between the in-furnace bed 15 and the out-furnace bed 20 for jetting air against the dual-curved glass sheet 18b to guide the latter. Other than the air jet nozzle 96, the apparatus 95 is constructed identically to the apparatus 10 according to the first embodiment.

With the in- and out-furnace beds 15, 20 arranged in the form of a chevron, there is a feat that in certain instances, a force for floating the glass sheet may fall short. To cater to such instances, the air jet nozzle 96 is provided to jet air to assist in floating the glass sheet. As a result, with the assistance of the air jetted from the nozzle 96, the dual-curved glass sheet 18b pulled past the downstream end of the in-furnace bed 15 can be transferred smoothly onto the out-furnace bed 20. Consequently, the under surface of the glass sheet 18b can be prevented from being scratched during transfer.

The air jet nozzle 96 may be arranged such that it can selectively jet hot air and cooling air as needs arise. The air jet nozzle 96 is arranged such that it can be vertically moved by an elevating means, not shown, to be brought into correspondence or harmonization with the elevated state of the in- and out-furnace beds 15, 20.

Figure 13:
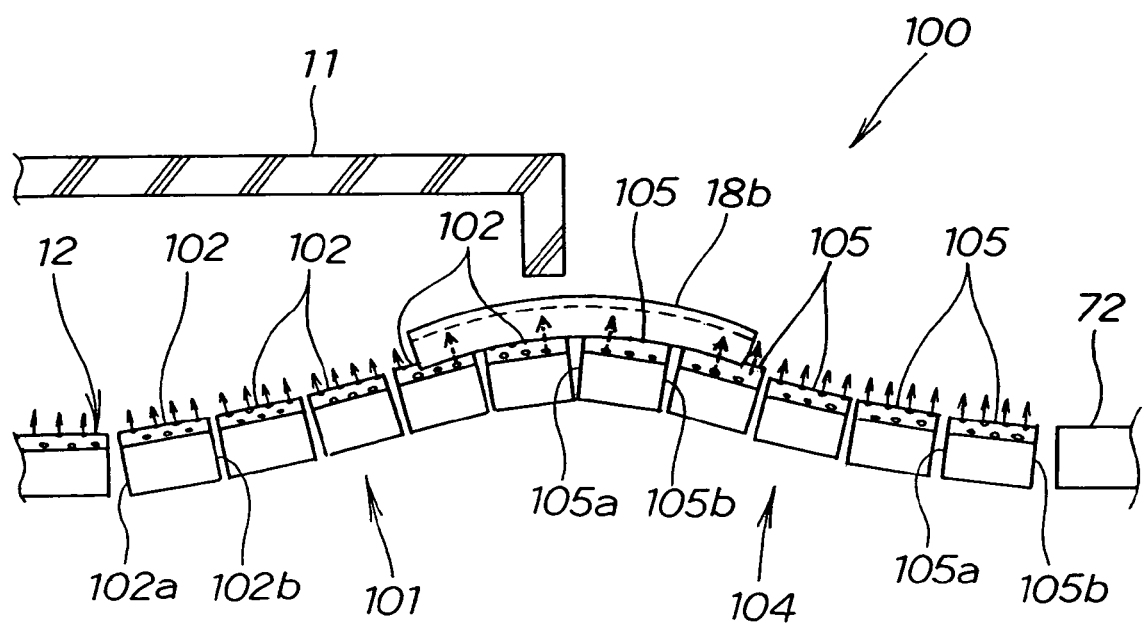
FIG. 13 is a schematic side elevational view showing relevant parts of a bend-shaping apparatus according to a fifth embodiment of the present invention.

Next, reference is made to FIG. 13 illustrating a bend-shaping apparatus 100 according to the fifth embodiment of the present invention.

In the bend-shaping apparatus 100, an in-furnace bed 101 is divided into five in-furnace bed pieces 102. These in-furnace bed pieces 102 have upstream ends 102a and downstream ends 102b, which can be raised by an in-furnace elevating mechanism, not shown, to form an uphill.

Similarly, the out-furnace bed 104 is divided into five out-furnace bed pieces 105. These out-furnace bed pieces 105 have upstream ends 105a and downstream ends 105b, which can be raised by an out-furnace elevating mechanism, not shown, to form a downhill. Other than these, the apparatus 100 is constructed identically to the apparatus 10 according to the first embodiment.

Since it is formed by the five in-furnace bed pieces 102, the uphill becomes gentle. Similarly, since it is formed by the five out-furnace bed pieces 105, the downhill becomes gentle. As a result, the dual-curved glass sheet 18b can be transferred more smoothly, thereby preventing the glass sheet 18b from being scratched at the lower surface thereof.

In the embodiment just described, the in-furnace bed 101 is divided into the five in-furnace bed pieces 102 while the out-furnace bed 104 is divided into the five out-furnace bed pieces 105. However, the in- and out-furnace beds 101, 104 may be divided into an arbitrary number of pieces. For example, the in-furnace bed 101 may be divided into three in-furnace bed pieces while the out-furnace bed 104 may be divided into two out-furnace bed pieces.

Figure 14:
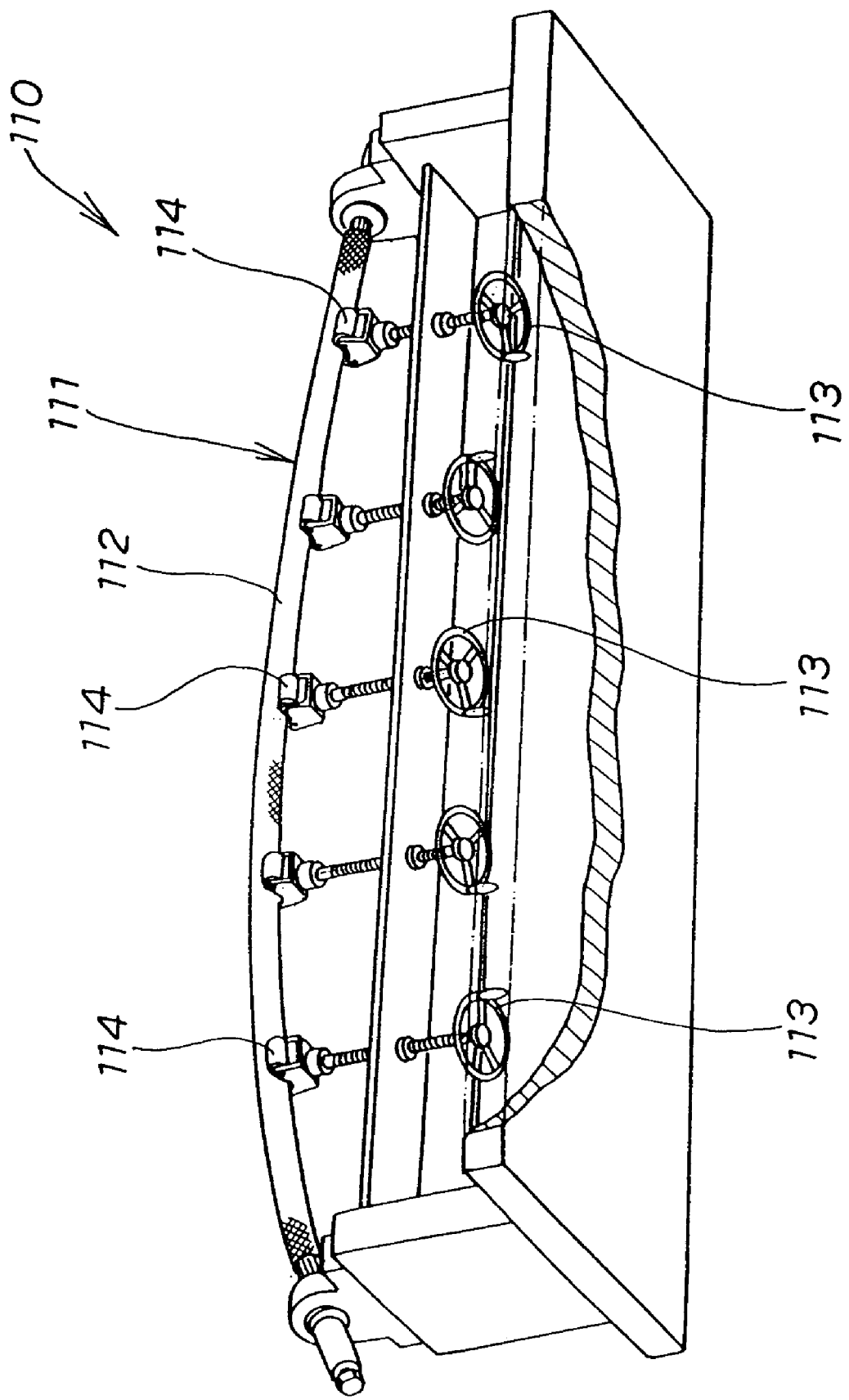
FIG. 14 is a schematic side elevational view showing relevant parts of a bend-shaping apparatus according to a sixth embodiment of the present invention.
Figure 15:
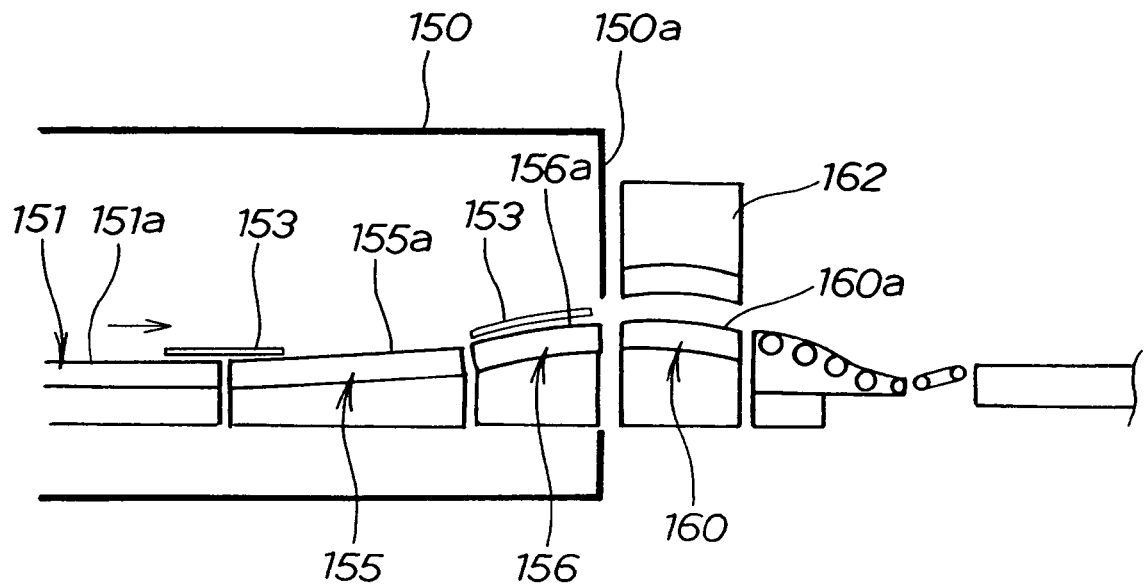
FIG. 15 is a schematic side elevational view showing a conventional bend-shaping apparatus.
Figure 16:
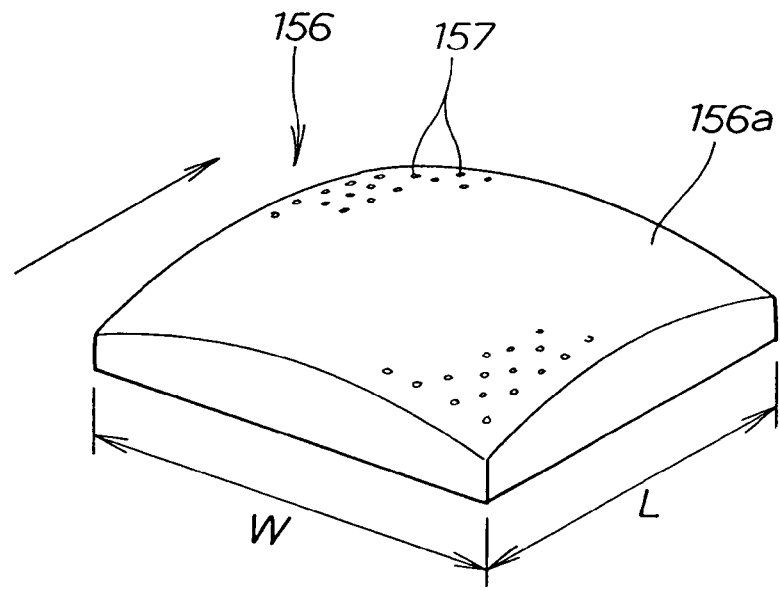
FIG. 16 is a schematic perspective view showing a conventional in-furnace bed.

Referring now to FIG. 14, discussion will be made next as to a bend-shaping apparatus according to the sixth embodiment of the present invention. The bend-shaping apparatus 110 includes a guide roll mechanism 111 provided in place of the guide roll 91 of the third embodiment (FIG. 11). Other than this, the apparatus 110 is constructed identically to the apparatus 90 according to the third embodiment.

The guide roll mechanism 111 comprises a roll body 112 in the form of a rod which can be adjustably deformed into an arc-shape. The guide roll mechanism 111 also includes a plurality of handles 113 and support rolls 114 whose height can be adjusted by operating the handles 113 to thereby adjust the arc-shape of the roll body 112 to conform to the shape of the dual-curved glass sheet 18b (FIG. 11).

This arrangement produces the same results as produced by the apparatus according to the third embodiment. Further, since the dual-curved glass sheet 18b is fully supported transversely by the guide roll mechanism 111, the glass sheet can be transferred more smoothly onto the out-furnace bed 20. As a result, the dual-curved glass sheet 18b can be prevented from being scratched at its under surface.

The guide roll mechanism 111 is arranged such that it can be vertically moved by an elevating mechanism, not shown, to conform to the elevated state of the in- and out-furnace beds 15, 20. Further, the guide roll mechanism 111 is detachably mounted to the apparatus so that it can be detached when the in- and out-furnace beds 15, 20 are laid flat. The guide roll mechanism 111 may be heated so as to prevent the glass sheet 18b from being cooled during transfer thereover.

In the above-described embodiments, both the downstream end 15a and upstream end 15b of the in-furnace bed 15 is elevated by the first elevating mechanism 31. Alternatively, arrangements may be made to raise only the downstream end 15a of the in-furnace bed 15. Similarly, although both the upstream end 20a and downstream end 20b of the out-furnace bed 20 are elevated by the second elevating mechanism 32 in those embodiments, arrangements may be made alternatively to raise only the upstream end 20a of the out-furnace bed 20.

In the above-described embodiments, although the first and second elevating mechanisms 31, 32 have been described to be hand-operated, the mechanisms 31, 32 may be arranged to be hydraulically or pneumatically operated.

Both the in- and out-furnace beds 15, 20 have been described to be slidingly moved by the slide mechanism 60 in the above-described embodiments. Alternatively, only one of those beds 15, 20 may be arranged to be slidingly moved.

Obviously, various minor changes and modifications of the present invention are possible in the light of the above teaching. It is therefore to be understood that within the scope of the appended claims, the invention may be practiced otherwise than as specifically described.

What is claimed is:

1. An apparatus for bend-shaping a glass sheet, comprising:

a heating furnace for heating the glass sheet, transferred therethrough along a path of travel thereof, to a substantially softening temperature of the glass sheet, said heating furnace having an inlet positioned upstream of said path of travel and an outlet positioned downstream of said path of travel;

a plurality of in-furnace beds disposed within said heating furnace, each of said in-furnace beds having an upper surface of upwardly convex shape with a curvature increasing progressively toward said outlet of said heating furnace, said upper surfaces being designed to jet hot air against the glass sheet to support the glass sheet in a floated state thereover such that the glass sheet bends transversely by own weight thereof complementarily to the shape of said upper surfaces;

at least one out-furnace bed disposed externally of said heating furnace proximately to said outlet of said heating furnace, said out-furnace bed having an upper surface of upwardly convex shape, said in-furnace beds and said out-furnace bed being arranged linearly along said path of travel; and an elevating mechanism, disposed below a downstream end of that one of said in-furnace beds which is positioned proximately to said outlet of said heating furnace and below an upstream end of said out-furnace bed, for elevating said downstream end of said one in-furnace bed and said upstream end of said out-furnace bed to cause said one in-furnace bed and said out-furnace bed to form a hill sloped in a direction along said path of travel, so that upon passage over said hill, the glass sheet bends longitudinally by own weight thereof complementarily to the shape of said hill, said upper surface of said out-furnace bed being designed to jet cold air against the glass sheet transferred past said outlet of said heating furnace to cool down the glass sheet while supporting the same in a floated state thereover.

2. An apparatus for bend-shaping a glass sheet, according to claim 1, further comprising a slide mechanism for sliding at least one of said one in-furnace bed and said out-furnace bed in said direction along said path of travel of the glass sheet.

3. An apparatus for bend-shaping a glass sheet, according to claim 1, wherein said one in-furnace bed has a downstream end surface of curved configuration, and said out-furnace bed has an upstream end surface of curved configuration.

4. An apparatus for bend-shaping a glass sheet, according to claim 1, wherein said downstream end surface of said one in-furnace bed has a lower corner, and said upstream end surface of said out-furnace bed has a lower corner, at least one of said lower corners of said downstream and upstream end surfaces being chamfered.

5. An apparatus for bend-shaping a glass sheet, according to claim 1, further comprising an air jet nozzle, disposed in a space defined between said one in-furnace bed and said out-furnace bed, for jetting air against the glass sheet to thereby guide the latter along said path of travel.

6. An apparatus for bend-shaping a glass sheet, according to claim 1, further comprising a guide roll, disposed in a space defined between said one in-furnace bed and said out-furnace bed, for guiding the glass sheet along said path of travel.

7. An apparatus for bend-shaping a glass sheet, according to claim 6, wherein said guide roll has a curved configuration conforming to the curved shape of the glass sheet.

* * * * *